US011481637B2

(12) United States Patent
Malaya

(10) Patent No.: US 11,481,637 B2
(45) Date of Patent: Oct. 25, 2022

(54) CONFIGURING COMPUTATIONAL ELEMENTS FOR PERFORMING A TRAINING OPERATION FOR A GENERATIVE ADVERSARIAL NETWORK

(71) Applicant: Advanced Micro Devices, Inc., Santa Clara, CA (US)

(72) Inventor: Nicholas P. Malaya, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 751 days.

(21) Appl. No.: 16/009,089

(22) Filed: Jun. 14, 2018

(65) Prior Publication Data

US 2019/0385064 A1    Dec. 19, 2019

(51) Int. Cl.
*G06N 3/08*    (2006.01)
(52) U.S. Cl.
CPC ..................... *G06N 3/088* (2013.01)
(58) Field of Classification Search
CPC ........... G06N 3/04; G06N 3/08; G06N 3/088; G06N 3/0454
See application file for complete search history.

(56) References Cited

U.S. PATENT DOCUMENTS

| 2016/0011652 | A1* | 1/2016 | Sadowski | G06F 13/28 |
| | | | | 713/323 |
| 2018/0137389 | A1* | 5/2018 | Mathieu | G06K 9/00718 |
| 2018/0189642 | A1* | 7/2018 | Boesch | G06F 13/4022 |
| 2018/0293496 | A1* | 10/2018 | Vogels | G06K 9/6298 |
| 2018/0307947 | A1* | 10/2018 | Choi | G06T 11/60 |
| 2019/0080205 | A1* | 3/2019 | Kaufhold | G06K 9/6257 |
| 2019/0139641 | A1* | 5/2019 | Itu | G06N 3/0427 |
| 2019/0244138 | A1* | 8/2019 | Bhowmick | H04L 9/008 |
| 2020/0204546 | A1* | 6/2020 | Li | G06F 21/32 |
| 2020/0372638 | A1* | 11/2020 | Gregson | G06T 7/0012 |

OTHER PUBLICATIONS

Wang, Yaxing, Lichao Zhang, and Joost Van De Weijer. "Ensembles of generative adversarial networks." arXiv preprint arXiv:1612.00991 (2016). (Year: 2016).*
Liu, Ming-Yu, and Oncel Tuzel. "Coupled generative adversarial networks." arXiv preprint arXiv:1606.07536 (2016). (Year: 2016).*

(Continued)

*Primary Examiner* — Kamran Afshar
*Assistant Examiner* — Randall K. Baldwin
(74) *Attorney, Agent, or Firm* — Park, Vaughan, Fleming & Dowler LLP

(57) ABSTRACT

An electronic device that includes a controller functional block and a computational functional block having one or more computational elements performs operations associated with a training operation for a generative adversarial network, the generative adversarial network including a generative network and a discriminative network. The controller functional block determines one or more characteristics of the generative adversarial network. Based on the one or more characteristics, the controller functional block configures the one or more computational elements to perform processing operations for each of the generative network and the discriminative network during the training operation for the generative adversarial network.

20 Claims, 6 Drawing Sheets

(56) References Cited

OTHER PUBLICATIONS

Tang, Weixuan, et al. "Automatic steganographic distortion learning using a generative adversarial network." IEEE Signal Processing Letters 24.10 (2017): 1547-1551. (Year: 2017).*

Israel, Steven A., et al. "Generative adversarial networks for classification." 2017 IEEE Applied Imagery Pattern Recognition Workshop (AIPR). IEEE, 2017: 1-4 (Year: 2017).*

Xiao, Xia, and Sanguthevar Rajasekaran. "Novel and Effective Parallel Mix-Generator Generative Adversarial Networks." (Feb. 15, 2018): 1-10 (Year: 2018).*

Yazdanbakhsh, Amir, et al. "Ganax: A unified mimd-simd acceleration for generative adversarial networks." 2018 ACM/IEEE 45th Annual International Symposium on Computer Architecture (ISCA). IEEE, Jun. 6, 2018: 650-661 (Year: 2018).*

Yazdanbakhsh, Amir, et al. "FlexiGAN: An End-to-End Solution for FPGA Acceleration of Generative Adversarial Networks" IEEE, May 1, 2018: 65-72 (Year: 2018).*

Chen, Fan, Linghao Song, and Yiran Chen. "Regan: A pipelined reram-based accelerator for generative adversarial networks." 2018 23rd Asia and South Pacific Design Automation Conference (ASP-DAC). IEEE, Jan. 2018: 178-183 (Year: 2018).*

* cited by examiner

CONFIGURING COMPUTATIONAL ELEMENTS FOR PERFORMING A TRAINING OPERATION FOR A GENERATIVE ADVERSARIAL NETWORK

BACKGROUND

Related Art

Some electronic devices perform operations for artificial neural networks or, more simply, "neural networks." Generally, a neural network is a computational structure that includes internal elements having similarities to biological neural networks, such as those in a living creature's brain, that can be trained to perform various types of operations. Neural networks are trained by using known information to configure the internal elements of the neural network so that the neural network can then perform an intended operation on unknown information. For example, a neural network may be trained by using digital images that are known to include images of faces to configure the internal elements of the neural network to react appropriately when subsequently analyzing digital images to determine whether the digital images include images of faces.

Neural networks include, in their internal elements, a set of artificial neurons, or "nodes," that are interconnected to one another in an arrangement similar to how neurons are interconnected via synapses in a living creature's brain. A neural network can be visualized as a form of weighted graph structure in which the nodes include input nodes, intermediate nodes, and output nodes. Within the neural network, each node other than the output nodes is connected to one or more downstream nodes via a directed edge that has an associated weight, where a directed edge is an interconnection between two nodes on which information travels in a specified direction. During operation, the input nodes receive inputs from an external source and process the inputs to produce input values. The input nodes then forward the input values to downstream intermediate nodes. The receiving intermediate nodes weight the received inputs based on a weight of a corresponding directed edge, i.e., adjust the received inputs such as multiplying by a weighting value, etc. Each intermediate node sums the corresponding weighted received inputs to generate an internal value and processes the internal value using an activation function of the intermediate node to produce a result value. The intermediate nodes then forward the result values to downstream intermediate nodes or output nodes, where the result values are weighted in accordance with a weight associated with the corresponding directed edge and processed thereby. In this way, the output nodes generate outputs for the neural network. Continuing the image processing example above, the outputs from the output nodes (and thus from the neural network) may be in a form that indicates whether or not a digital image includes an image of a face, such as being a value from 0, for very unlikely to include an image of a face, to 1, for very likely to include an image of a face.

As described above, values forwarded along directed edges between nodes in a neural network are weighted in accordance with a weight associated with each directed edge. By setting the weights associated with the directed edges during a training operation so that desired outputs are generated by the neural network, the neural network can be trained to produce intended outputs such as the above-described identification of faces in digital images. When training a neural network, numerous instances of input data having expected or desired outputs are processed in the neural network to produce actual outputs from the output nodes. Continuing the neural network example above, the instances of input data would include digital images that are known to include (or not include) images of faces, and thus for which the neural network is expected to produce outputs that indicate that a face is likely present (or not) in the images. After each instance of input data is processed in the neural network to produce an actual output, an error value, or "loss," between the actual output and a corresponding expected output is calculated using mean squared error, log loss, or another algorithm. The loss is then worked backward through the neural network, or "backpropagated" through the neural network, to adjust the weights associated with the directed edges in the neural network in order to reduce the error for the instance of input data, thereby adjusting the neural network's response to that particular instance of input data—and all subsequent instances of input data. For example, one backpropagation technique involves computing a gradient of the loss with respect to the weight for each directed edge in the neural network. Each gradient is then multiplied by a training coefficient or "learning rate" to compute a weight adjustment value. The weight adjustment value is next used in calculating an updated value for the corresponding weight, e.g., subtracted from an existing value for the corresponding weight.

In the past, training neural networks to "discriminate," or to identify patterns in instances of input data such as faces in digital images—as is done in the example neural network above—proved simpler than training neural networks to "generate," or create new instances of output data that include specified patterns. In pursuit of the goal of neural networks that generate instances of output data having specified patterns, or "generative networks," researchers have proposed a number of techniques, including a technique that is known as "generative adversarial networks." For generative adversarial networks, a first neural network, called a discriminative network, is used to train a second neural network, called a generative network, to generate instances of output data that include specified patterns. In a seminal paper describing the technique, *Generative Adversarial Nets*, Proceedings of the 27th International Conference on Neural Information Processing Systems Vol. 2, Goodfellow likened the generative network to a forger that is trying, without prior knowledge of paintings of a specified subject, to generate forged paintings of the specified subject, and the discriminative network to a detective that is trying to identify paintings produced by the generative network as forgeries. As part of the training of the generative adversarial network, the generative network generates, based on random or other input data, instances of output data that are intended to include a specified pattern (e.g., digital images that ostensibly include images of dogs). The discriminative network, which is trained to recognize the specified pattern in instances of input data (e.g., images of dogs in digital images), then analyzes the instances of output data from the generative network for similarity to the specified pattern and returns, to the generative network, a result (e.g., a value between 0 and 1) indicating the similarity for each instance of output data. The results are used, in corresponding backpropagation step(s), to adjust the internal elements (weights, etc.) of the generative network, thereby adjusting the generative network's response to the instances of input data—and to subsequent instances of input data. Over a number of iterations, based on the feedback from the discriminative network, the generative network can begin to generate instances of output data that are more likely to include the specified pattern. Continuing Goodfellow's analogy, the generative network becomes a more successful forger, despite not initially having seen the painting to be forged, based on the judgments of the discriminative network/detective.

The training operation for generative networks is computationally intensive and may require a large number of iterations to train a generative network to generate instances of output data that are likely to include a specified pattern. There is therefore a need to improve the efficiency of the training operation.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.
Terminology In the following description, various terms are used for describing embodiments. The following is a simplified and general description of one of these terms. Note that the term may have significant additional aspects that are not recited herein for clarity and brevity and thus the description is not intended to limit the term.

Figure 1:
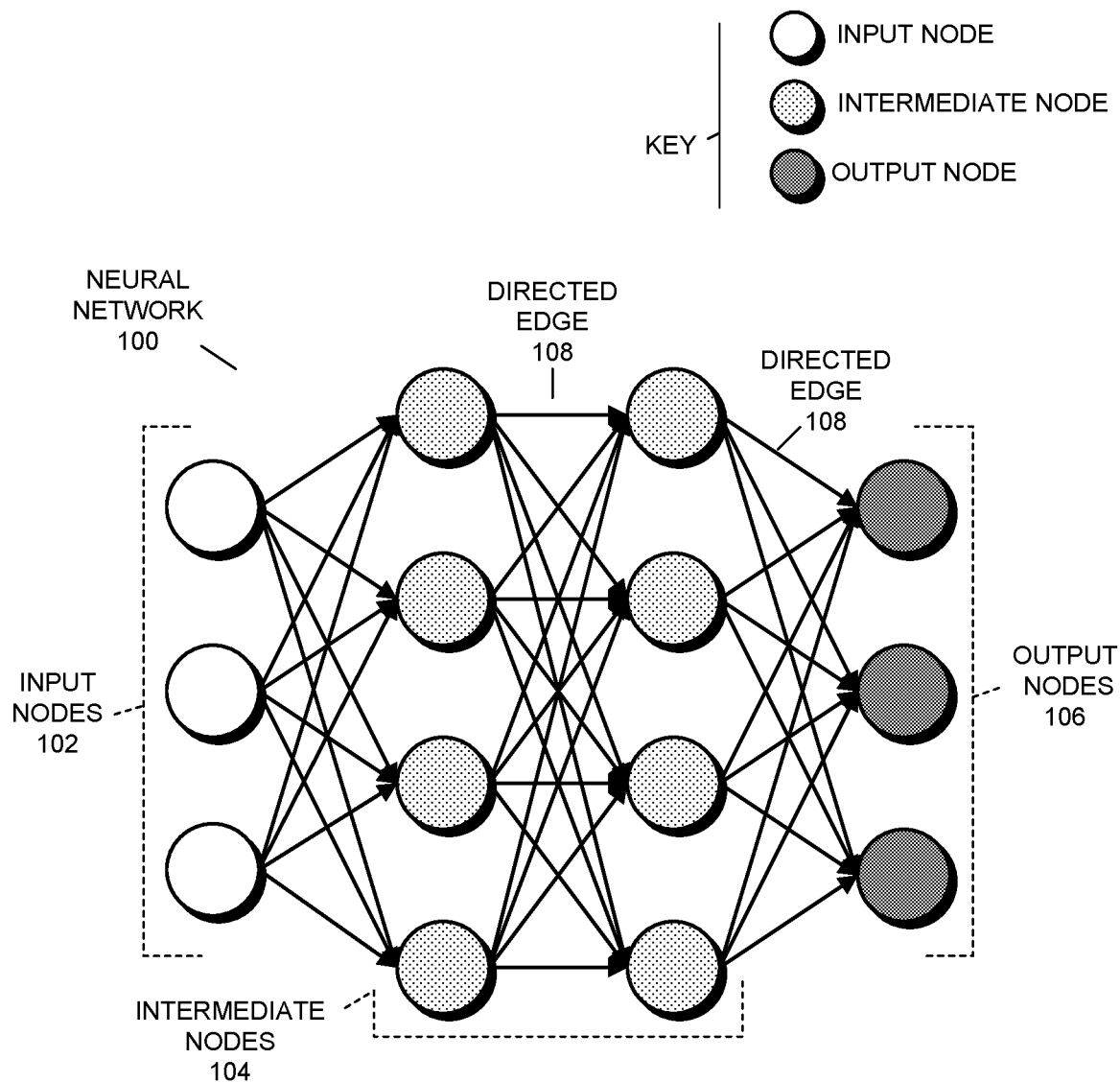
FIG. 1 presents a block diagram illustrating a neural network in accordance with some embodiments.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element, etc. A functional block can include any number of circuit elements, from a single circuit element (e.g., a single integrated circuit logic gate) to millions or billions of circuit elements (e.g., an integrated circuit memory), etc.
Neural Networks As described above, a neural network is a computational structure that includes internal elements (e.g., nodes, etc.) that are trained to perform specified tasks, such as image recognition or generation, audio recognition or generation, etc. FIG. 1 presents a block diagram illustrating a neural network 100 including input nodes 102, intermediate nodes 104, output nodes 106, and directed edges 108 in accordance with some embodiments (only two of the directed edges are labeled for clarity).

Depending on the nature of the internal elements of neural network 100, neural network 100 can be a "discriminative" network or a "generative" network. A discriminative network is a neural network that is configured to process instances of input data and output results that indicate whether specified patterns are likely to be present in the instances of input data. For example, a discriminative network may be configured to output results indicating whether faces or road signs are likely present in digital images, whether particular sounds or words are likely present in digital audio, etc. A generative network is a neural network that is configured to generate instances of output data that include patterns having similarity to specified patterns. For example, the generative network may be configured to generate digital images that include patterns similar to faces or road signs, audio that includes patterns similar to particular sounds or words, etc.

Figure 2:
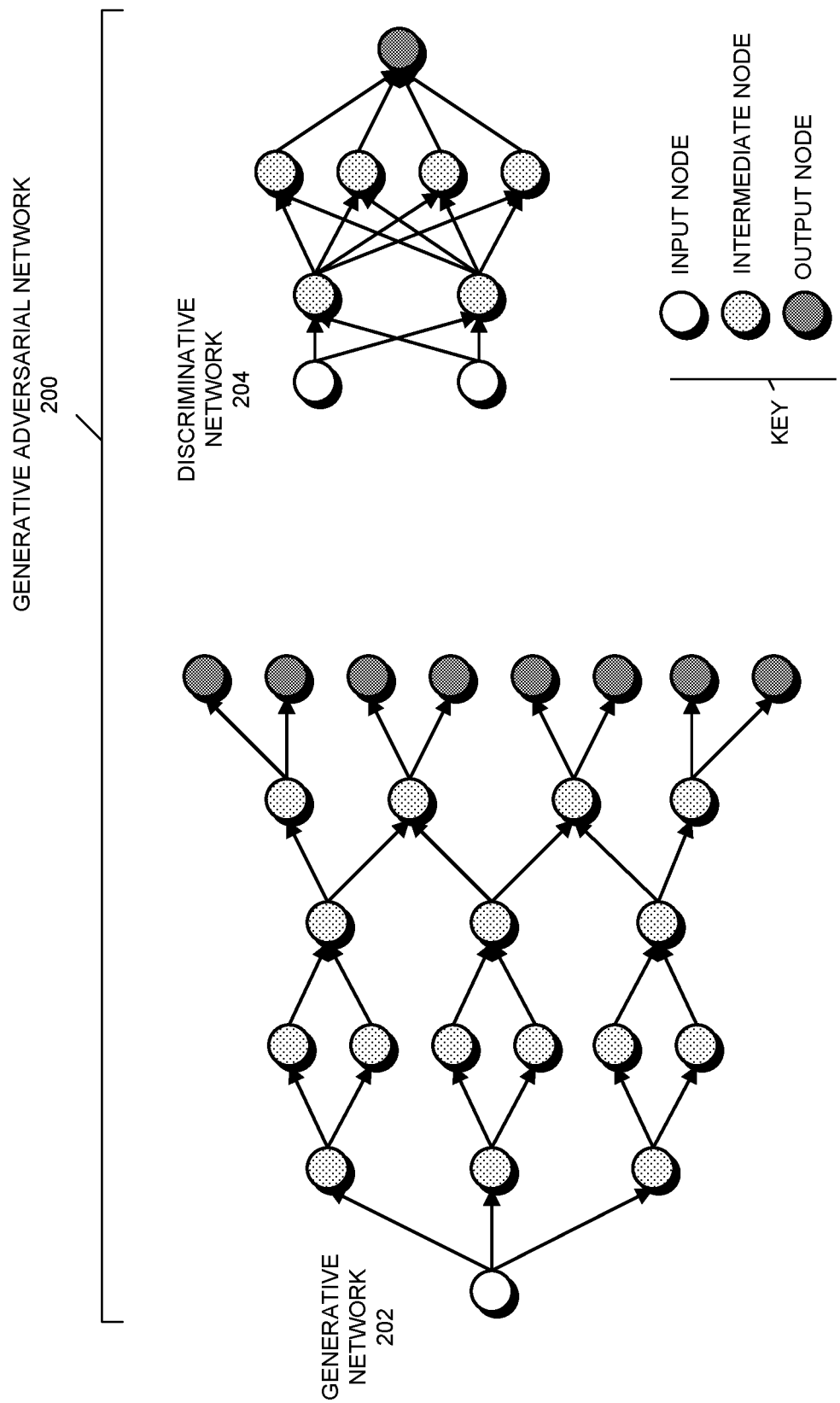
FIG. 2 presents a block diagram illustrating a generative adversarial network in accordance with some embodiments.

Although an example of a neural network is presented in FIG. 1, in some embodiments, a different arrangement of nodes and/or layers or levels is used. For example, a neural network can include a number—and in some cases, a large number—of intermediate nodes arranged in multiple layers or levels, each layer or level of intermediate nodes receiving input values and forwarding generated result values to intermediate nodes in the next layer or level or to output nodes. As another example, in some embodiments, a different topography or connectivity of nodes is used and/or different types of nodes are used, such as the arrangements and types of nodes used in neural networks including radial basis networks, recurrent neural networks, auto encoders, Markov chains, deep belief networks, deep convolutional networks, deep residual networks, etc. Generally, the described embodiments are operable with any configuration of neural network(s) for which a training operation can be performed as described herein.
Generative Adversarial Network A generative adversarial network is an arrangement of neural networks that includes a generative network and a discriminative network. The discriminative network in the generative adversarial network is used for training the generative network to generate instances of output data that are likely to include specified patterns. FIG. 2 presents a block diagram illustrating a generative adversarial network in accordance with some embodiments. As can be seen in FIG. 2, generative adversarial network 200 includes generative network 202 and discriminative network 204, each of which is a separate neural network having input node(s), intermediate nodes, and output node(s) as described above. Although generative network 202 and discriminative network 204 are presented as examples of a generative network and a discriminative network, in some embodiments, different arrangements or types of nodes are used in one or both of generative network 202 and discriminative network 204. Generally, the described embodiments are operable with any arrangement of generative network and discriminative network for which training operations can be performed as described herein.

During a training operation for a generative adversarial network, the discriminative network (e.g., discriminative network 204) is trained using instances of input data from a target data set that include (or do not include) a specified pattern, such as faces in digital images, etc. Based on the training, the discriminative network is configured to output results indicating a likelihood that a given instance of input data—including a previously unknown instance of input data—includes the specified pattern. For example, the discriminative network may output results ranging from 0, for almost certainly does not include the specified pattern, to 1, for almost certainly includes the specified pattern. In some embodiments, the discriminative network is completely trained before being used in a next step of the training operation, although this is not a requirement. For example, the discriminative network may be trained on a few instances of input data to give the discriminative network a "head start," but additional training for the discriminative network may be interleaved with using the discriminative network to analyze instances of output data from the generative network (e.g., generative network 202). In other words, the training of the discriminative network may be ongoing with the use of the discriminative network to analyze instances of output data from the generative network, thereby continuing to improve the accuracy of the results of the discriminative network "on the fly."

Next in the training operation for the generative adversarial network, the generative network is trained to generate instances of output data that include patterns similar to the specified pattern. When training the generative network, input data (e.g., random noise, an instance of input data from a specified set, etc.) is processed through the generative network to generate an instance of output data that ostensibly includes the specified pattern. The instance of output data from the generative network is then processed, as an instance of input data, using the discriminative network to generate an output result that indicates whether the instance of output data likely includes the specified pattern. The output from the discriminative network is next backpropagated (e.g., in a similar way to the above-described loss values) through the generative network to configure the internal structures of the generative network (e.g., to set weight values, etc.), thereby adjusting the generative network's response to the instance of input data—and to subsequent instances of input data. This process is repeated a number (and possibly a large number) of times, with the generative network generating instances of output data and subsequently being reconfigured using corresponding output results from the discriminative network. Generally, during the above-described training, which can be considered a form of "unsupervised learning," the generative network is configured, with the assistance of the discriminative network, so that the generative network is more likely to generate instances of output data that include the specified pattern.

As can be seen in FIG. 2, and as is typical in generative adversarial networks, the arrangement of nodes in each of generative network 202 and discriminative network 204 is different. In other words, in the embodiment in FIG. 2, generative network 202 includes more layers of intermediate nodes and more intermediate nodes than discriminative network 204, as well as having different numbers of input and output nodes. Due to these differences, processing instances of input data and/or generating instances of output for generative network 202 and discriminative network 204 can take different amounts of time, compute cycles, etc. In other words, the amount of time, number of compute cycles, etc. that are required for processing an instance of input data through generative network 202 is, due to the different arrangement of nodes, different and likely longer, larger, etc. than the amount of time, number of compute cycles, etc. that are required for processing an instance of input data through discriminative network 204. In addition, each round of training for generative network 202 and discriminative network 204 may involve a different number of iterations, may involve continued training for discriminative network 204, etc. Because, as described above, the training process for generative network 202 relies on feedback from discriminative network 204, the differences in amount of time, number of compute cycles, number of iterations, continued training for discriminative network 204, etc., can result in inefficiencies in the training process when training generative network 202. For example, when executed in parallel on equivalent computing hardware, the hardware performing processing operations for the simpler discriminative network 204 may sit idle while waiting for a next instance of input data to be generated (as an instance of output data) by the hardware performing operations for generative network 202. In this case, if faster computing hardware is used for performing processing operations for discriminative network 204, the amount of idle time may be increased. Because training generative network 202 ordinarily involves processing a large number of instances of input data and communicating back and forth with discriminative network 204, even small mismatches in execution time, compute cycles, numbers of iterations, etc. can mean that some computing hardware spends a significant amount of time idle during the training process.

Although an embodiment is shown in FIG. 2 in which a generative adversarial network includes only one generative network and one discriminative network, in some embodiments, different numbers of generative networks and/or discriminative networks are present in the generative adversarial network. The operations herein described can be used with embodiments that include multiple generative networks and/or multiple discriminative networks, although the operations are applied to and used on the combination of neural networks. For example, the characteristics of the multiple generative networks and/or the multiple discriminative networks may be used to determine how computational elements are to be configured for performing processing operations for the generative networks and/or the discriminative networks during a training operation for the generative adversarial network.

Overview

The described embodiments include an electronic device with a controller functional block and a computational functional block that perform operations associated with training a generative adversarial network. In the described embodiments, the controller functional block configures one or more computational elements in the computational functional block to perform respective processing operations for the generative network and the discriminative network while performing the training operations for the generative adversarial network. In the described embodiments, the controller functional block uses one or more characteristics of the generative adversarial network and/or other characteristics to determine how the one or more computational elements are to be configured. For example, given a single computational element such as a microprocessor, the controller functional block can, based on the characteristics, schedule one or more execution threads, arrange execution time periods/slices, set instruction schedules, etc. used for performing processing operations for each of the generative network and the discriminative network. As another example, given multiple computational elements, the controller functional block can, based on the characteristics, select separate subsets of the computational elements for performing processing operations for each of the generative network and the discriminative network.

In the described embodiments, the controller functional block can use various characteristics of the generative adversarial network to determine how the one or more computational elements are to be configured. For example, in some embodiments, execution times for an iteration of a training operation for each of the generative network and the discriminative network, or a difference therein, are characteristics that are used in making the determination. As another example, in some embodiments, a number, type, and/or arrangement of internal elements in one or both of the generative network and the discriminative network are characteristics that are used in making the determination.

In some embodiments, along with or as an alternative to the characteristics of the generative adversarial network, the controller functional block can use one or more other characteristics to determine how the one or more computational elements are to be configured. In these embodiments, the other characteristics can include characteristics of the electronic device, the software environment of the electronic device, and/or other characteristics that may affect the training of the generative network. For example, in some embodiments, the other characteristics that are used in making the determination include properties of the one or more computational elements (e.g., number, type, processing power or throughput, physical location, communication bandwidth, etc.). As another example, in some embodiments, the other characteristics that are used in making the determination include a software load profile of the generative network and/or the discriminative network, environmental conditions for the electronic device (e.g., heat of or generated by components, memory reading or writing patterns, etc.), etc.

In some embodiments, the controller functional block dynamically configures the one or more computational elements. In other words, as the electronic device operates during and after a start-up operation, the controller functional block, based on the one or more characteristics of the generative adversarial network and/or the other characteristics, configures/reconfigures the one or more computational elements to perform processing operations for each of the generative network and the discriminative network. In these embodiments, one or more runtime characteristics—i.e., hardware and/or software conditions that may change during operation of the electronic device—can be used as at least some of the characteristics for making the determination. In some of these embodiments, the controller functional block dynamically configures the computational elements at specified times (e.g., every N microseconds, when a designated event occurs, etc.).

In some embodiments, other aspects of the training operation for training the generative adversarial network are adjusted along with or as an alternative to the above-described configuration of the one or more computational elements. For example, in some embodiments, the controller functional block adjusts operations performed during iterations of a training operation for one or both of the generative network and the discriminative network, such as by adjusting a number of instances of input data that are processed in one or both of the generative network and the discriminative network during iterations of the training operation. As another example, in some embodiments, the controller functional block adjusts an operand and/or result precision used by one or both of the generative network and the discriminative network during iterations of the training operation.

By configuring the one or more computational elements to perform processing operations based on the above-described characteristics and/or adjusting the other aspects of the training operation for the generative adversarial network, the described embodiments enable the one or more computational elements to be more effectively used during the training operation. This can help to avoid unnecessary delays, unbalanced loading for computational elements, idle computational elements, and other inefficiencies that occur in existing electronic devices, which can improve the speed and computational resource usage of the electronic device during the training operation. The improved functioning of the electronic device can lead in turn to higher user satisfaction.

Electronic Device

Figure 3:
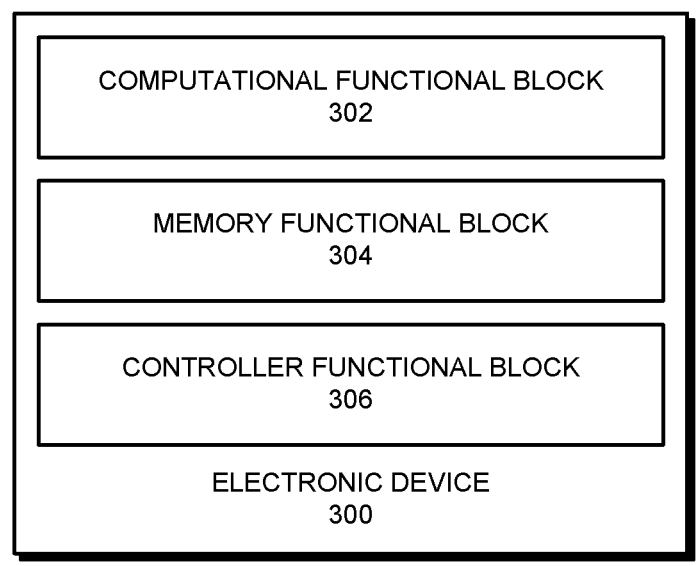
FIG. 3 presents a block diagram illustrating an electronic device in accordance with some embodiments.

FIG. 3 presents a block diagram illustrating electronic device 300 in accordance with some embodiments. As can be seen in FIG. 3, electronic device 300 includes computational functional block 302, memory functional block 304, and controller functional block 306. Generally, computational functional block 302, memory functional block 304, and controller functional block 306 are implemented in hardware, i.e., using various circuit elements and devices. For example, computational functional block 302, memory functional block 304, and controller functional block 306 can be entirely fabricated on one or more semiconductor chips, including on one or more separate semiconductor chips for each of the functional blocks, can be fashioned from semiconductor chips in combination with discrete circuit elements, can be fabricated from discrete circuit elements alone, etc. As described herein, computational functional block 302, memory functional block 304, and controller functional block 306 perform operations for a training operation for a generative network.

Computational functional block 302 is a functional block that performs computational and other operations (e.g., control operations, configuration operations, etc.). For example, computational functional block may be or include a general purpose graphics processing unit (GPGPU), a central processing unit (CPU), an application specific integrated circuit (ASIC), a field-programmable gate array (FPGA), etc. Computational functional block 302 includes one or more computational elements (and possibly a large number of computational elements) such as one or more processors, execution pipelines, compute units, application-specific integrated circuits, gate arrays, etc. In some embodiments, computational functional block 302 provides support for one or more execution threads, contexts, etc.

In the described embodiments, included in the operations performed by computational functional block 302 are training operations for a generative adversarial network. For example, computational functional block 302 may perform operations such as mathematical, logical, or control operations for processing input data through the generative network to generate an instance of output data—i.e., feeding the input data forward through the generative network to generate the instance of output data. As another example, computational functional block 302 may perform operations such as mathematical, logical, or control operations for processing instances of input data through the discriminative network to generate result values. These operations can include operations such as evaluating activation functions for nodes in the generative network or the discriminative network, computing weighted values, forwarding result values between nodes, etc. Computational functional block 302 may also perform operations for using the result values generated by the discriminative network to adjust one or more internal elements of the discriminative network (when training the discriminative network) or to adjust one or more internal elements in the generative network (when training the generative network). For example, computational functional block 302 may backpropagate result values from the discriminative network—or a value determined based thereon—through the generative network in order to make adjustments to weights and/or other values in the generative network. This can, depending on the particular implementation of the backpropagation, include operations such as computing gradients of the result value or a value based thereon with respect to weights in the neural network, computing adjusted weight values using the gradients, etc.

Memory functional block 304 is a memory in electronic device 300 (e.g., a "main" memory), and includes memory circuits such as one or more dynamic random access memory (DRAM), double data rate synchronous DRAM (DDR SDRAM), non-volatile random access memory (NVRAM), and/or other types of memory circuits for storing data and instructions for use by functional blocks in electronic device 300, as well as control circuits for handling accesses of the data and instructions that are stored in the memory circuits. In some embodiments, memory functional block 304 is used for storing information about the generative adversarial network (e.g., program code defining the generative adversarial network, metadata including information about the generative adversarial network, etc.), instances of input data, and/or other files or information to be used during a training operation for the generative adversarial network.

Controller functional block 306 is a functional block that performs operations relating to the configuration of computational elements for a training operation for a generative network and possibly other operations. In some embodiments, controller functional block 306 includes processing circuits that determine one or more characteristics of a generative adversarial network and/or other characteristics and, based on the characteristics, configure portions of the computational elements in computational functional block 302 to perform processing operations for each of the generative network and the discriminative network during a training operation for the generative network. For example, assuming that computational functional block 302 includes N compute units and N>M, controller functional block 306 may, based on the one or more characteristics, configure N-M compute units to perform processing operations for the generative network and M compute units to perform processing operations for the discriminative network.

Although controller functional block 306 is shown separately from the other functional blocks, in some embodiments, controller functional block 306 is not a separate functional block. For example, in some embodiments, the operations described herein as being performed by controller functional block 306 are instead performed by computational functional block 302, such as by general purpose and/or dedicated processing circuits in computational functional block 302.

Electronic device 300 is simplified for illustrative purposes. In some embodiments, however, electronic device 300 includes additional or different functional blocks, subsystems, elements, and/or communication paths. For example, electronic device 300 may include display subsystems, power subsystems, I/O subsystems, etc. Electronic device 300 generally includes sufficient functional blocks, etc. to perform the operations herein described.

Electronic device 300 can be, or can be included in, any device that performs computational operations. For example, electronic device 300 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof.

Multiple Electronic Devices

Although a single electronic device is shown in FIG. 3, in some embodiments, separate electronic devices from among a group of two or more electronic devices (e.g., one or more server computers, processing boards and/or devices connected to a shared bus and/or wired/wireless network, etc.) perform respective portions of the operations herein described. For example, in some embodiments, one or more electronic devices perform processing operations for the generative network and one or more other electronic devices perform processing operations for the discriminative network during a training operation. As another example, in some embodiments, the training operation is divided into sub-operations, e.g., processing instances of input data through the generative network and the discriminative network, backpropagating loss values, etc., and each of the sub-operations is performed on a separate subset of a set of electronic devices (e.g., GPGPUs) (i.e., each of the sub-operations may be performed on different subsets of the set of electronic devices). In these embodiments, the one or more computational elements used for performing the various processing operations during the training operation include a plurality of computational elements, with computational elements being or located in each of the multiple electronic devices.

Training a Generative Adversarial Network

The described embodiments perform a training operation for a generative adversarial network. In the described embodiments, as part of the training operation, a discriminative network in a generative adversarial network is trained to determine whether instances of input data are likely to include a specified pattern, such as whether digital images are likely to include images of dogs. In addition, a generative network in the generative adversarial network is trained, with the assistance of the discriminative network, to generate instances of output data that are likely to include the specified pattern. The training operation for the generative adversarial network can be divided into two phases. During the first phase, the discriminative network is trained. During the second phase, the generative network is trained with the assistance of the discriminative network. In some embodiments, the training of the discriminative network, which is started in the first phase, continues into the second phase, as described in more detail below.

In some embodiments, when training the discriminative network, instances of input data having expected or desired outputs are processed in the discriminative network to generate actual output results. For example, the discriminative network may generate, as the actual output results, values from 1, which indicates that a corresponding instance of input data is very unlikely to include the specified pattern, to 5, which indicates that the corresponding instance of input data is very likely to include the specified pattern. After the actual output is generated for each instance of input data, an error value, or loss, between the actual output and a corresponding expected output is calculated using mean squared error, log loss, or another algorithm. The loss is then backpropagated through the discriminative network to adjust the internal elements of the discriminative network, e.g., the weights associated with the directed edges in the discriminative network, in order to reduce the error or loss for the instance of input data, thereby adjusting the discriminative network's response to the instance of input data—and all subsequent instances of input data. For example, in some embodiments, the backpropagating includes computing a gradient of the loss with respect to the weight for each directed edge in the discriminative network. Each gradient is multiplied by a training coefficient to compute a weight adjustment value and the weight adjustment value is used to calculate an updated value for the corresponding weight, e.g., subtracted from an existing value for the corresponding weight. Although a particular type of training is presented as an example, in some embodiments, at least some different training operations are performed. Generally, the described embodiments are operable with any training algorithm or technique that is used to train the discriminative network to determine whether instances of input data are likely to include a specified pattern as described herein.

In some embodiments, the discriminative network is completely trained before the second phase of the training operation, and thus training operations for the discriminative network are only performed in the first phase. In some embodiments, however, the training of the discriminative network continues into the second phase. For example, in the first phase, the discriminative network may initially be trained on a relatively small number of instances of input data to give the discriminative network a "head start" in determining whether instances of input data include a specified pattern, but the training of the discriminative network may be continued in the second phase. In some of these embodiments, the number of instances of input data that are used for training the discriminative network during the second phase is larger (and possibly much larger) than the number of instances of input data that are used during the first phase. For the following examples, an embodiment is described in which the training for the discriminative network continues into the second phase. Note, however, that embodiments in which the discriminative network is completely trained in the first phase are similar to the operations below, albeit without including training operations for the discriminative network itself in the second phase.

Figure 4:
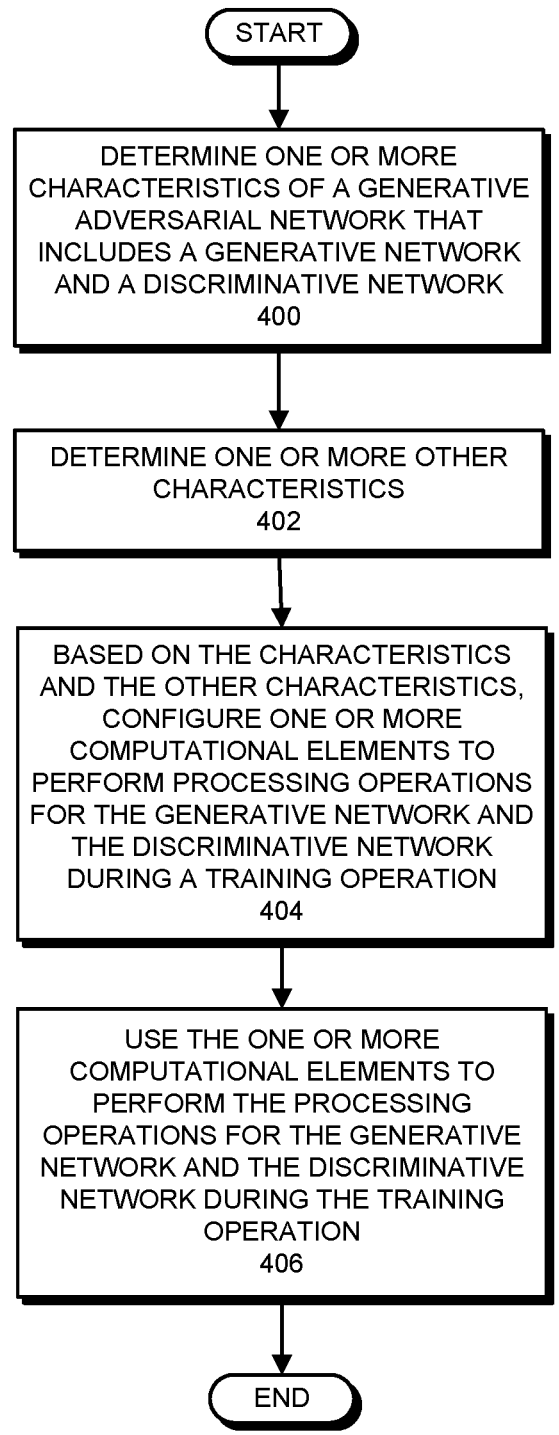
FIG. 4 presents a flowchart illustrating a process for configuring one or more computational elements to perform processing operations for a generative network and a discriminative network during a training operation for a generative adversarial network in accordance with some embodiments.

At some time before the second phase, i.e., before, during, or after the first phase, the controller functional block (e.g., controller functional block 306) uses one or more characteristics of a generative adversarial network and/or other characteristics to determine how one or more computational elements are to be configured for performing processing operations for each of the generative network and the discriminative network during the training operation. FIG. 4 presents a flowchart illustrating a process for configuring one or more computational elements to perform processing operations for the generative network and the discriminative network during a training operation in accordance with some embodiments. Note that the operations shown in FIG. 4 are presented as a general example of functions performed by some embodiments. The operations performed by other embodiments include different operations and/or operations that are performed in a different order. For example, in some embodiments, step 402 is not performed, and the "characteristics" used in step 404 are those determined in step 400 alone. Additionally, although certain mechanisms are used in describing the process (e.g., controller functional block 306, computational functional block 302, etc.), in some embodiments, other mechanisms can perform the operations.

The process shown in FIG. 4 starts when the controller functional block determines one or more characteristics of the generative adversarial network (step 400). For this operation, the controller functional block checks, measures, or otherwise acquires one or more characteristics of the generative adversarial network. For example, in some embodiments, the characteristics include the arrangements of internal elements in the generative network and/or the discriminative network. As another example, in some embodiments, the characteristics include an amount of execution time (or number of computational cycles, etc.) for performing one or more iterations of a training operation for the generative network and the discriminative network. Generally, in the described embodiments, any characteristic of the generative adversarial network that is available to the controller functional block can be used in step 400.

For embodiments in which the characteristics include the arrangement of internal elements in the generative adversarial network, the controller functional block analyzes, acquires information about, or otherwise processes a structure of the generative adversarial network to determine the arrangement of internal elements in the generative network and discriminative network. For example, the controller functional block can determine a number of input, intermediate, and/or output nodes ("nodes"), a number of levels or layers of nodes, a connectivity of nodes, type(s) of nodes, activation functions associated with some or all of the nodes, weighting values, etc. in each of the discriminative network and the generative network. In some of these embodiments, the controller functional block determines the arrangement of internal elements in the generative network and/or the discriminative network based on information in one or more files or memory locations that include definitions of the generative adversarial network, the generative network and/or the discriminative network (e.g., program code in which the generative adversarial network is defined, data in memory that represents the generative adversarial network, etc.). In some of these embodiments, the controller functional block determines the arrangement of internal elements in the generative network and/or the discriminative network based on dedicated metadata associated with the generative adversarial network that includes information about the generative network and the discriminative network. For example, a metadata file that includes a description of the generative adversarial network may be created by program code, by the controller functional block or the computational functional block, etc.

In some embodiments, the controller functional block determines, based on the arrangement of the internal elements, an estimate of execution time or relative execution time for each of the generative network and the discriminative network that can then be used to configure the one or more computational elements for performing the processing operations for the generative network and the discriminative network. For example, each internal element, e.g., node, layer, etc., can be associated with an execution time, and the various execution times can be summed or otherwise combined based on the arrangement to generate the estimated execution time.

For embodiments in which the characteristics include the amount of execution time, the controller functional block measures or otherwise acquires the amount of execution time for performing one or more iterations of the training operation for each of the generative network and the discriminative network. As used herein, an "iteration" of the training operation includes operations for a single round of training for the generative network and the discriminative network, e.g., that are to be performed between communications between the generative network and the discriminative network. For example, during an iteration of the training operation, the generative network may perform a single round of training for the generative network by: backpropagating a result value received from the discriminative network to adjust internal elements (weights, etc.) in the generative network and processing an instance of input data to generate an instance of output data, not necessarily in that order. As another example, during an iteration of the training operation, the discriminative network may perform a single round of training for the discriminative network and perform an analysis of an instance of input data received from the generative network by: processing an instance of input data to generate a result value, backpropagating the result value to adjust internal elements (weights, etc.) in the discriminative network, and processing the instance of input data received from the generative network to generate a result value, not necessarily in that order. In these embodiments, an iteration of the training operation is performed in each of the generative network and the discriminative network and the execution time is measured, recorded, or otherwise determined by the controller functional block or received or acquired from another entity. In some of these embodiments, the controller functional block causes or otherwise triggers the one or more iterations of the training operation to enable the measurement, such as by signaling or requesting a portion of the one or more computational elements to perform the one or more iterations of the training operations—which may include providing mock or dummy instances of input data, result values, etc. to the portion of the one or more computational elements. For example, given N computational elements (e.g., GPGPU compute units), the controller functional block may case a separate N/2 of the computational elements to perform processing operations for the one or more iterations of the training operation for each of the generative network and the discriminative network. The controller functional block then determines a first execution time for performing the one or more iterations of the training operation for the generative network and a second execution time for performing the one or more iterations of the training operation for the discriminative network, such a number of microseconds, a number of cycles, etc.

Returning to FIG. 4, the controller functional block next determines one or more other characteristics (step 402). For this operation, the controller functional block checks, measures, or otherwise acquires one or more characteristics that may affect the training of the generative network or otherwise be useful in determining a configuration of the one or more computational elements for performing processing operations for each of the generative network and the discriminative network. For example, in some embodiments, the other characteristics include characteristics of the electronic device (e.g., electronic device 100), such as a number of available computational elements or portions thereof, physical locations of the individual computational elements, a communication bandwidth of or between the computational elements, a speed of interactions between the computational elements, an amount of available memory for each computational element, a computational power or configuration of each computational element (e.g., a type or arrangement of internal processing circuits), and/or other hardware properties of the electronic device. As another example, in some embodiments, the other characteristics include a load on the one or more computational elements, a temperature of the one or more computational elements, an execution profile (e.g., type of operations, etc.) for a computational load being executed by the one or more computational elements, a power source, a software property or version of the one or more computational elements, and/or another property of the electronic device.

The controller functional block next, based on the characteristics, configures one or more computational elements to perform processing operations for each of the generative network and the discriminative network during the training operation (step 404). For this operation, the controller functional block uses the characteristics to determine a portion of one or more computational elements that are to be used to perform processing operations for each of the generative network and the discriminative network. The controller functional block then sets, allocates, or otherwise arranges the respective portion of the one or more computational elements for performing processing operations for each of the generative network and discriminative network.

In order to determine the portion of one or more computational elements that are to be used to perform processing operations for each of the generative network and the discriminative network, the controller functional block uses one or more rules, records, functions, thresholds, and/or other guides (referred to as a group in the following description, for clarity, simply as "rules") to determine how a set of available portions of the one or more computational elements are to be apportioned for performing the processing operations. Generally, the rules relate or otherwise associate particular characteristics or combinations thereof to respective portions of the one or more computational elements. In some embodiments, the rules are received or otherwise acquired from external sources, e.g., from a configuration file or system setting, from a software application or operating system, etc. In some embodiments, the rules are determined wholly or partially by the controller functional block. For example, the controller functional block may monitor the performance of processing operations (e.g., busy/idle times, operational throughput, temperatures, bus bandwidth consumed, etc.) for the one more computational elements during one or more rounds of training and may set/reset rules about the portions of the one or more computational elements for corresponding characteristics or combinations thereof. In some of these embodiments, the rules start in an initial state, which may be received from an external source, such as read from a configuration file, firmware, a memory location, etc., and the controller functional block dynamically updates the rules based on the monitored performance of processing operations as the electronic device operates during one or more training operations.

As an example of using rules to determine how a set of available portions of the one or more computational elements are to be apportioned, in some embodiments, the controller functional block performs a lookup in a table or other record that relates the arrangement of internal elements (e.g., number of nodes, layers, types of nodes, etc.) in each of the generative network and the discriminative network to portions of the one or more computational elements. For instance, if the generative network has twice the number of nodes of the discriminative network, the table may relate the proportion 2:1 to a split of $\frac{2}{3}$ and $\frac{1}{3}$, so that the portions of the one or more computational elements used to perform processing operations for each of the generative network and the discriminative network are $\frac{2}{3}$ and $\frac{1}{3}$, respectively.

As another example of using rules to determine how a set of available portions of the one or more computational elements are to be apportioned, in some embodiments, the controller functional block computes, using a specified mathematical function, the portions of the one or more computational elements based on the execution times for performing one or more iterations of the training operation for each of the generative network and the discriminative network. In some of these embodiments, the function is a ratio of the combined execution times, a result of which is fitted to the available portions of the one or more computational elements. For example, an execution time of 3*N microseconds for the generative network and N microseconds for the discriminative network means that a result of 0.75 or ¾ is computed for the ratio for the generative network. In this case, the portion of the one or more computational elements used to perform processing operations for each of the generative network and the discriminative network are ¾ and ¼, respectively. In some embodiments, other and/or more complex mathematical functions may be used, including mathematical functions having constants, bias values, scaling factors, decay values, etc. In some embodiments, multivariate and/or multi-value mathematical functions that are functions of two or more of the above-described characteristics may be used, possibly along with constants, bias values, etc. Generally, any mathematical function that can produce, given values for one or more characteristics as inputs, a result that can be used to determine the portions of the one or more computational elements can be used in the described embodiments.

As yet another example of using the above-described rules to determine how a set of available portions of the one or more computational elements are to be apportioned, in some embodiments, the controller functional block uses a location of each of the one or more computational elements within a set of integrated circuit chips (and/or other relationships between the one or more computational elements such as being in the same computer chassis, being coupled to one or more circuit boards, being communicatively coupled via high-speed interconnects, etc.) to determine, based on one or more thresholds or specifications, the portions of the one or more computational elements. For example, if a subset of the one or more computational elements are located on a single integrated circuit chip, and other subset(s) of the computational elements are located on other integrated circuit chips, in other computer chassis, etc.—as may happen with multi-core microprocessors on a circuit board or processors in different server computers—the one or more thresholds or specifications may indicate that the generative network is preferentially to be executed in a single integrated circuit chip. In this case, the portion of the one or more computational elements may be the computational elements in a single integrated circuit chip.

In some embodiments, using the above-described characteristics (e.g., execution times, arrangement of internal elements, characteristics of the computational elements, etc.) and rules to determine how a set of available portions of the one or more computational elements are to be apportioned involves substantially balancing an execution time of the generative network and the discriminative network for subsequent iterations of the training operation. For example, in some embodiments, an execution time is determined for performing one or more iterations of the training operation using respective numbers of computational elements for each of the generative network and the discriminative network. Continuing the example above, separate halves (N/2) of the computational elements may be used to perform processing operations for ten iterations of the training operation using each of the generative network and the discriminative network. A contribution value, which is a per-computational-element, per-iteration value, can then be determined for each of the generative network and the discriminative network. The contribution values for each of the generative network and the discriminative network can then be used, e.g., in a ratio or other expression or function, to determine how available portions of the one or more computational elements are to be divided between performing operations for the generative network and the discriminative network for subsequent iterations of the training operation so that the execution time is substantially balanced. In other words, in these embodiments, the controller functional block attempts, in setting the portions, to set the portions so that an execution time for performing processing operations for one or more iterations of the training operation for the generative network and the discriminative network is as close to equal as possible. By balancing the execution times for performing processing operations for iterations of the training operation as described, the described embodiments can make it so that the generative network and the discriminative network communicate between one another (instances of output data and result values, respectively) in such a way that the portion of the computational elements performing processing operations for each of the generative network and the discriminative network are less likely to sit idle. That is, when the generative network or the discriminative network is ready to process a result value or an instance of output data, respectively, the result value or the instance of output data has recently been or will soon be produced by the other of the generative network or the discriminative network.

In some embodiments, if the portion of the one or more computational elements cannot be set precisely in accordance with the rules, the computational functional block may meet the rules to the extent possible. In other words, the controller functional block may preferentially follow the rules, but use less-desirable portions of the one or more computational elements for performing the processing operations when the rules cannot be followed precisely. For example, given a particular set of characteristics, a corresponding rule may indicate that the processing operations for the generative network should be performed by processors on a single circuit board, but the operating environment (e.g., many available processors on many circuit boards) may dictate that processors on two or more circuit boards be allocated for performing the processing operations for the generative network and/or the discriminative network. In this case, the controller functional block may attempt to use processors on particular circuit boards for performing the processing operations, etc. As another example, a rule for a particular pair of execution times for the generative network and the discriminative network may indicate that certain portions of the one or more computational elements are to be used, but the one or more computational elements may not be divisible in this way (e.g., four available portions cannot be divided five ways, etc.), so closest or best-available portions may be used. In some embodiments, a hierarchy of rules and/or sub-rules, e.g., fall-back rules, is provided so that the controller functional block can determine the portions accordingly.

When setting, allocating, or otherwise arranging the respective portion of the one or more computational elements for performing processing operations for each of the generative network and discriminative network as described for step 404, the controller functional block uses one or more hardware and/or software controls to arrange the portion of the one or more computational elements to perform the processing operations for each of generative network or the discriminative network—or some part thereof. For example, assuming an embodiment in which a single computational element is used, e.g., a single multi-threaded microprocessor core, one or more execution threads can be scheduled so that respective portions of an available execution time for the thread are assigned to program code for each of the generative network and the discriminative network. For instance, if the single computational element has five available threads, and thus time slots or quanta, and the portion for the generative network is 3/5 and the discriminative network is 2/5, three of the threads can be assigned to executing program code (i.e., performing processing operations) for the generative network and two of the threads can be assigned to executing program code for the discriminative network. As another example, assuming an embodiment in which multiple separate computational elements, e.g., GPGPU compute units, processor cores, FPGA elements, etc., are available, corresponding portions of the computational elements can be configured to execute program code (i.e., perform processing operations) for each of the generative network and the discriminative network. For instance, if the multiple computational elements include 128 computational elements and the portion for the generative network is 70% and the discriminative network is 30%, 90 of the computational elements can be assigned to executing program code for the generative network and 38 of the thread time slots can be assigned to executing program code for the discriminative network. In this case, there is not a perfect match between portions and available computational elements, but the portions are as close of a match as possible, as described above.

The controller functional block then causes a computational functional block (e.g., computational functional block 302) to use the one or more computational elements to perform processing operations for each of the generative network and the discriminative network during the training operation (step 406). For this operation, the controller functional block requests, signals, or otherwise causes the computational functional block as described above to use the portions of the one or more computational elements to perform processing operations for each of the generative network and the discriminative network. Note that step 406 is or precedes, in some embodiments, the commencement of the second phase of the training operation.

Processing Operations for a Discriminative Network and a Generative Network during a Training Operation As described above, the training operation for a generative adversarial network can be divided into two phases. In the first phase, the discriminative network alone is trained. In the second phase, the generative network is trained with the assistance of the discriminative network and training is continued for the discriminative network. At some time before the commencement of the second phase, the controller functional block performs the operations of FIG. 4. In other words, the controller functional block, based on one or more characteristics of the generative adversarial network, the electronic device, etc., determines a portion of one or more computational elements to be used to perform processing operations for the generative network and the discriminative network during at least the second phase of the training operation.

Figure 5:
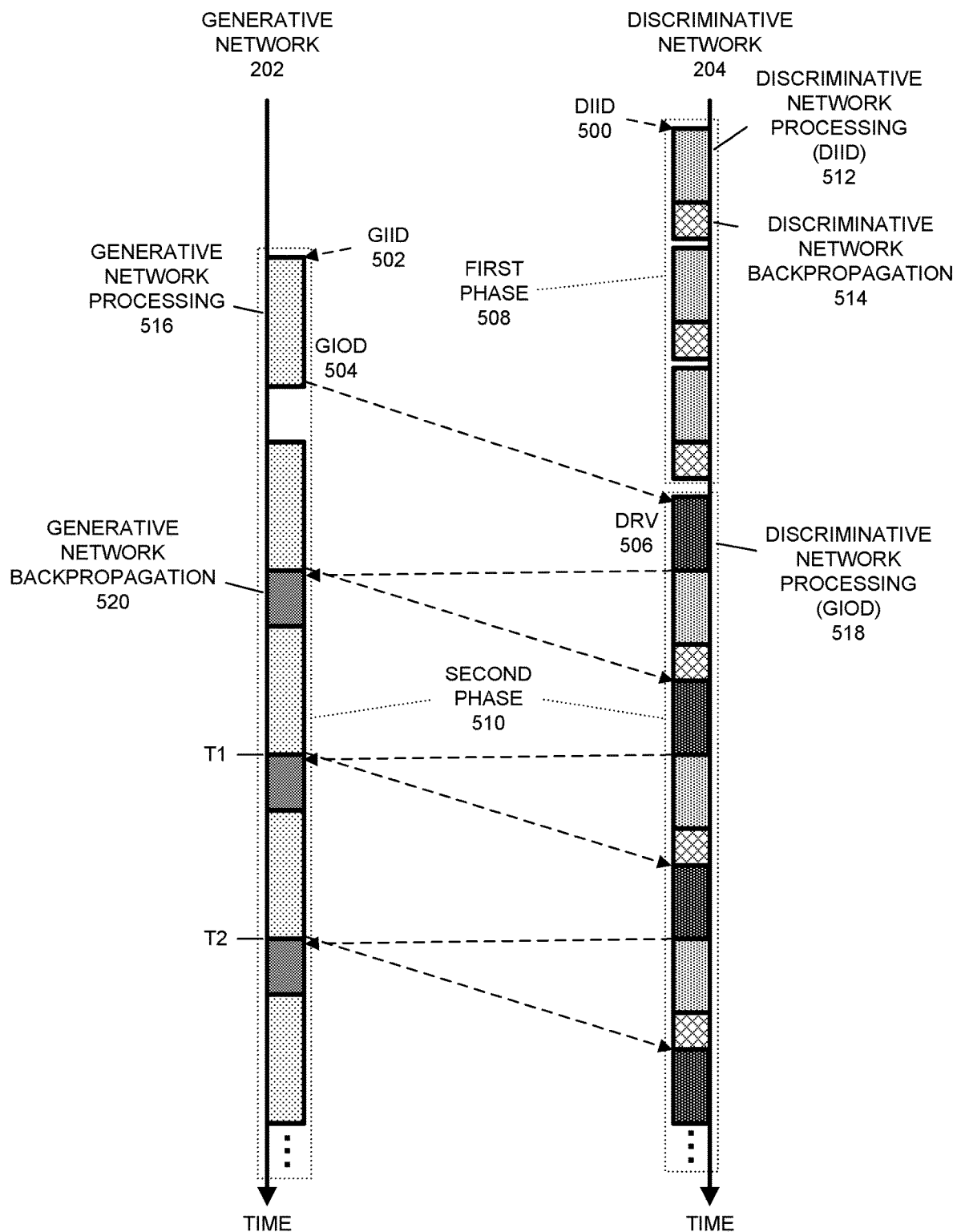
FIG. 5 presents a swim lane diagram illustrating processing operations for a generative network and a discriminative network during a training operation for a generative adversarial network in accordance with some embodiments.

FIG. 5 presents a swim lane diagram illustrating processing operations for the generative network and the discriminative network during a training operation for the generative adversarial network in accordance with some embodiments. Note that the operations shown in FIG. 5 are presented as a general example of functions performed by some embodiments. The operations performed by other embodiments include different operations and/or operations that are performed in a different order. For example, in some embodiments, the discriminative network is completely trained during the first phase, and there is no training of the discriminative network interleaved with analysis of generative network instances of output data. As another example, the second phase may include a larger number of iterations of the training operation, as shown by the ellipses in FIG. 5.

As described in more detail above, training the discriminative network involves processing instances of input data that are known to include (or not) a specified pattern through the discriminative network and then backpropagating corresponding results to configure internal values of the discriminative network (e.g., weight values, etc.). In the example in FIG. 5, for the first phase 508 of the training operation, which is outlined using a dotted line, there are three instances of input data processed through the discriminative network to generate actual results indicating whether it is likely that the instances of input data included the specified pattern, which are then backpropagated to configure the internal values in the discriminative network. For one of the instances of input data, i.e., discriminative network instance of input data (DIID) 500, the processing is shown as discriminative network processing (DIID) 512 and the backpropagation is shown as discriminative network backpropagation 514 (the other instances are not labeled for clarity). The processing operations for each instance of input data are shown using different fill patterns (i.e., dots and cross-hatching) for simplified visibility. At the end of the first phase, the discriminative network is at least partially trained to produce results indicating whether instances of input data include a specified pattern.

As described in more detail above, training the generative network involves processing instances of input data (e.g., random numbers, etc.) through the generative network to produce instances of output data that are intended to include a specified pattern. The instances of output data are then processed through the discriminative network to generate result values indicating whether the instances of output data from the generative network include (or are likely to include) the specified pattern. The result values from the discriminative network are backpropagated through the generative network to configure internal values of the generative network (e.g., weight values, etc.). In the example in FIG. 5, in the second phase 510 of the training operation, which is outlined with a dotted line, for a first instance of input data, i.e., generative network instance of input data (GIID) 502, the processing is shown as generative network processing 516, which produces generative network instance of output data (GIOD) 504 that ostensibly includes the specified pattern. GIOD 504 is communicated to the discriminative network (or, rather, to computational elements performing processing operations for the discriminative network) for processing therein, shown as discriminative network processing of generative network instance of output data (GIOD) 518, to generate a result value, i.e., discriminative network result value (DRV) 506, that indicates whether (or not) the GIOD 504 is likely to include the specified pattern. DRV 506 is communicated to the generative network (or, rather, to computational elements performing processing operations for the generative network) to be backpropagated through the generative network to adjust internal elements therein, which is shown as generative network backpropagation 520. The processing operations for each iteration of the training operation for the generative network and the discriminative network in the second phase are shown using different fill patterns (i.e., different dot patterns) for simplified visibility. At the end of the second phase (which, as shown by the ellipses, continues beyond what is shown in FIG. 5), the generative network is trained to produce instances of output data that are more likely to include the specified pattern.

In addition to performing operations for training the generative network, the training of the discriminative network is continued in the second phase 510. This is shown in FIG. 5 using the repeated fill patterns from the first phase 508 (i.e., dots and cross-hatching). As can be seen in FIG. 5, the training for the discriminative network is interleaved with, or alternates with, the analysis of generative network instances of output data. In other words, the portion of the one or more computational elements that perform operations for the discriminative network performs all of the operations shown for the discriminative network in second phase 510.

In the embodiment shown in FIG. 5, the controller functional block has, when previously performing the operations of FIG. 4, configured the one or more computational elements so that the execution time of the generative network and the discriminative network are substantially balanced while performing iterations of the training operation. This can be seen, for example, in the operations between times T1 and T2 in FIG. 5. Between times T1 and T2, the generative network performs operations for a single iteration of the training operation for each/both of the generative network and the discriminative network. The operations for the single iteration of the training operation include, for the generative network, backpropagating a result value received from the discriminative network to adjust internal elements (weights, etc.) in the generative network and processing an instance of input data to generate an instance of output data. The operations for the single iteration of the training operation include, for the discriminative network, processing an instance of input data to generate a result value, backpropagating the result value to adjust internal elements (weights, etc.) in the discriminative network, and processing the instance of input data received from the generative network to generate a result value. Because the iterations of the training operation are completed in substantially equal time for each of the generative network and the discriminative network, the communications from the discriminative network and the generative network (i.e., GIOD 504 and DRV 506) are available when needed and neither the generative network nor the discriminative network, i.e., the portion of the computational elements performing operations for the generative network or the discriminative network, sits idle, waiting for the communications. This keeps the portions of the computational elements busy doing productive work instead of waiting for communications, which helps to increase the performance of the electronic device.

Figure 6:
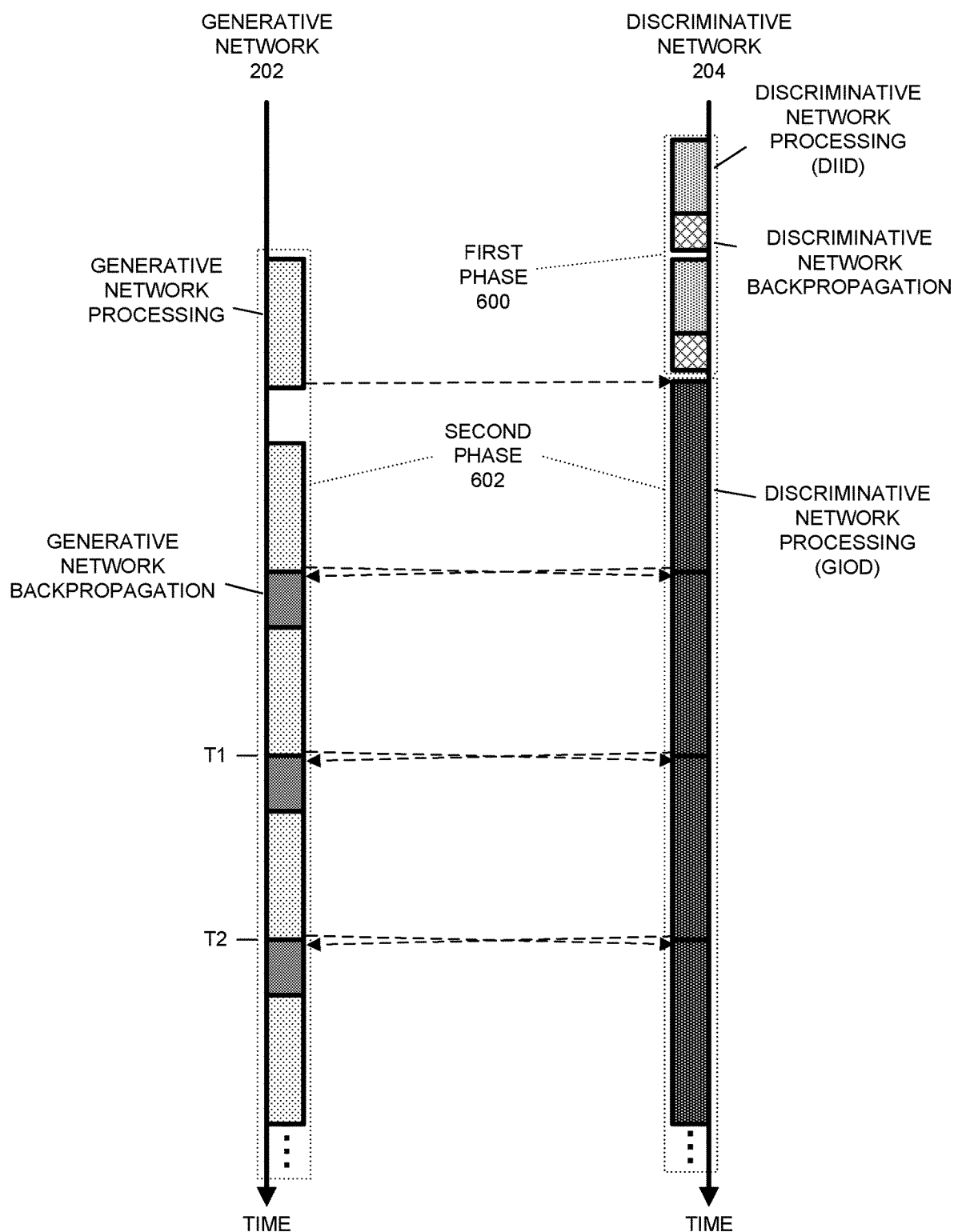
FIG. 6 presents a swim lane diagram illustrating processing operations for a generative network and a discriminative network during a training operation for a generative adversarial network in accordance with some embodiments.

As described above, in some embodiments, and differently than what is shown in FIG. 5, the discriminative network is completely trained in the first phase, so that training operations for the discriminative network are not interleaved with using the discriminative network to assist in training the generative network. FIG. 6 presents a swim lane diagram illustrating processing operations for the generative network and the discriminative network during a training operation for the generative adversarial network in accordance with some embodiments. Note that the operations shown in FIG. 6 are presented as a general example of functions performed by some embodiments. The operations performed by other embodiments include different operations and/or operations that are performed in a different order. Many of the operations shown in FIG. 6 are similar to those shown in FIG. 5, although some of the labels that are shown in FIG. 5 are not shown in FIG. 6 for clarity. As can be seen in FIG. 6, in the first phase 600 of the training operation, the discriminative network alone is trained (see the description of FIG. 5 for a more detailed description of the operations). In the second phase 602, the portion of the computational elements performing operations for the discriminative network perform only processing operations for forwarding GIODs through the discriminative network to generate DRVs (again, see the description of FIG. 5 for a more detailed description of the operations).

Although iterations of a training operation in which single instances of input data (GIID 502, GIOD 504, etc.) are processed through the generative network and the discriminative network, in some embodiments, more instances of input data are processed through the generative network and the discriminative network during each iteration of the training operation. For example, in some embodiments, for one iteration of the training operation, 120, 230, or another number of generative network instances of input data (GIID) may be processed through the generative network to generate a corresponding number of generative network instances of output data (GIOD), which are then processed through the discriminative network as a group in a corresponding single iteration of the training operation. In these embodiments, the above-described operations are different in that the multiple instances of input data are processed during each iteration of the training operation, but are otherwise similar to what is shown in FIGS. 4-6.

Dynamic Reconfiguration

In some embodiments, the controller functional block dynamically performs the above-described configuration of the computational elements during the training operation. In these embodiments, based on various factors, such as monitored system performance, the occurrence of one or more events, the passing of a specified amount of time, etc., the controller functional block may (re)evaluate the portions of the one or more computational elements being used to perform processing for each of the generative network and the discriminative network during the training operation. For example, after a specified number of iterations of the training operation have been performed, the controller functional block can perform some or all of the operations shown in FIG. 4 to reconfigure the computational elements to perform processing operations for the generative network and the discriminative network. In other words, based at least in part on one or more real-time characteristics, the controller functional block periodically re-balances the portions of the one or more computational elements that are being used for performing processing operations for the generative network and the discriminative network.

Adjusting Other Aspects of the Training Operation

In some embodiments, other aspects of the training operation are adjusted along with the above-described configuration of the computational elements. For example, in some embodiments, for each iteration of the training operation, multiple instances of input data are processed in one or both of the generative network and the discriminative network. For example, N instances of input data (e.g., 20, 250, or another number) may be processed in the generative network to generate corresponding instances of output data that each ostensibly include a specified pattern, which are then individually processed in the discriminative network to return result values that are backpropagated in the generative network to adjust internal elements of the generative network as described above. In these embodiments, the number of instances of input data that are processed in one or both of the generative network and the discriminative network may be adjusted to help in substantially balancing an execution time of the generative network and the discriminative network for subsequent iterations of the training operation. For example, when the execution time of the generative network is longer than the execution time of the discriminative network during iterations of the training operation during which 145 instances of input data are processed in the generative network, a smaller number of instances of input data such as 120 or 100 may be processed in the generative network during instances of the training operation to shorten the execution time—thereby better balancing the execution time of the generative network and the discriminative network for iterations of the training operation. As another example, when training of the discriminative network is interleaved with using the discriminative network to process instances of output data from the generative network, the number of instances of input data used for training the discriminative network may be adjusted to shorten the execution time of the training iteration. Although such an adjustment may make more iterations of the training operation necessary (due to the loss of instances of input data in each iteration), each iteration can be shorter and communication can be better timed, which can more efficiently use the computational elements.

In some embodiments, an electronic device (e.g., electronic device 300, and/or some portion thereof) uses code and/or data stored on a non-transitory computer-readable storage medium to perform some or all of the operations herein described. More specifically, the electronic device reads the code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), compute units, embedded processors, graphics processors (GPUs)/graphics cores, pipelines, Accelerated Processing Units (APUs), system management units, power controllers, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., computational functional block 302, controller functional block 306, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the system performs a first operation, a second operation, etc.," the system performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
a computational functional block that includes one or more computational elements; and
a controller functional block configured to:
determine one or more characteristics of a generative adversarial network that comprises a generative network and a discriminative network;
determine, based on one or more rules relating the one or more characteristics of the generative adversarial network to portions of the one or more computational elements to be used for performing processing operations for the generative network and the discriminative network, separate portions of the one or more computational elements to be used for performing processing operations for the each of the generative network and the discriminative network so that respective execution times are substantially balanced for the generative network and the discriminative network during processing operations for iterations of a training operation; and set the separate portions of the one or more computational elements to be used for performing processing operations for the each of the generative network and the discriminative network while subsequently performing iterations of the training operation.

2. The electronic device of claim 1, wherein the one or more characteristics of the generative adversarial network comprise:

an execution time for the generative network and the discriminative network while performing one or more iterations of the training operation.

3. The electronic device of claim 2, wherein:

determining the one or more characteristics of the generative adversarial network comprises:

performing, using a respective portion of the one or more computational elements to perform processing operations for each of the generative network and the discriminative network, one or more iterations of a training operation for each of the generative network and the discriminative network; and determining a respective time for performing the one or more iterations of the training operation for each of the generative network and the discriminative network; and determining the separate portions of the one or more computational elements comprises:

determining, based at least in part on the respective execution times and the respective portions, a first portion of the one or more computational elements to perform processing operations for the generative network and a second portion of the one or more computational elements to perform processing operations for the discriminative network so that the respective execution times are substantially balanced for the generative network and the discriminative network while the generative network and the discriminative network perform the respective processing operations for the iterations of the training operation.

4. The electronic device of claim 3, wherein determining the first portion and the second portion comprises:

determining the first portion and the second portion based on an idle time, the idle time being proportional to a difference between the respective execution times.

5. The electronic device of claim 1, wherein the one or more characteristics of the generative adversarial network comprise:

at least one of numbers and arrangements of internal elements in the generative network and the discriminative network.

6. The electronic device of claim 1, wherein:

the controller functional block is further configured to determine one or more other characteristics; and determining the separate portions of the one or more computational elements comprises determining the one or more computational elements based on both:

the one or more characteristics of the generative adversarial network; and the one or more other characteristics.

7. The electronic device of claim 6, wherein the one or more other characteristics comprise at least one of hardware properties and software properties of the electronic device.

8. The electronic device of claim 6, wherein:

the one or more computational elements comprise at least two computational elements; and the one or more other characteristics comprise speeds of interactions between individual computational elements in the at least two computational elements.

9. The electronic device of claim 1, wherein the generative network and the discriminative network have different arrangements of internal elements.

10. The electronic device of claim 1, wherein the controller functional block is further configured to adjust a number of instances of input data processed through the generative network or the discriminative network during one or more iterations of the training operation.

11. A method for training a generative adversarial network using an electronic device that includes a controller functional block and a computational functional block having one or more computational elements, the method comprising:

determining, by the controller functional block, one or more characteristics of the generative adversarial network, the generative adversarial network comprising a generative network and a discriminative network;

determining, based on one or more rules relating the one or more characteristics of the generative adversarial network to portions of the one or more computational elements to be used for performing processing operations for the generative network and the discriminative network, separate portions of the one or more computational elements to be used for performing processing operations for the each of the generative network and the discriminative network so that respective execution times are substantially balanced for the generative network and the discriminative network during processing operations for iterations of a training operation; and setting, by the controller functional block, the separate portions of the one or more computational elements to be used for performing processing operations for the each of the generative network and the discriminative network while subsequently performing iterations of a training operation.

12. The method of claim 11, wherein the one or more characteristics of the generative adversarial network comprise:

an execution time for the generative network and the discriminative network while performing one or more iterations of the training operation.

13. The method of claim 12, wherein: determining the one or more characteristics of the generative adversarial network comprises:

performing, using a respective portion of the one or more computational elements to perform processing operations for each of the generative network and the discriminative network, one or more iterations of a training operation for each of the generative network and the discriminative network; and determining a respective execution time for performing the one or more iterations of the training operation for each of the generative network and the discriminative network; and determining the separate portions of the one or more computational elements comprises:

determining, based at least in part on the respective execution times and the respective portions, a first portion of the one or more computational elements to perform processing operations for the generative network and a second portion of the one or more computational elements to perform processing operations for the discriminative network so that the respective execution times are substantially balanced for the generative network and the discriminative network while the generative network and the discriminative network perform the respective processing operations for the iterations of the training operation.

14. The method of claim 13, wherein determining the first portion and the second portion comprises:
determining the first portion and the second portion based on an idle time, the idle time being proportional to a difference between the respective execution times.

15. The method of claim 11, wherein the one or more characteristics of the generative adversarial network comprise:
an arrangement of internal elements in the generative network and the discriminative network.

16. The method of claim 11, further comprising:
determining, by the controller functional block, one or more other characteristics, wherein determining the separate portions of the one or more computational elements comprises determining the one or more computational elements based on both the one or more characteristics of the generative adversarial network and the one or more other characteristics.

17. The method of claim 16, wherein the one or more other characteristics comprise at least one of hardware properties and software properties of the electronic device.

18. The method of claim 16, wherein:
the one or more computational elements comprise at least two computational elements; and
the one or more other characteristics comprise speeds of interactions between individual computational elements in the at least two computational elements.

19. The method of claim 11, further comprising:
adjusting a number of instances of input data processed through the generative network or the discriminative network during one or more iterations of the training operation.

20. A non-transitory computer-readable storage medium storing instructions that, when executed by an electronic device that includes a controller functional block and a computational functional block having one or more computational elements, cause the electronic device to perform a method for training a generative adversarial network, the method comprising:
determining one or more characteristics of the generative adversarial network, the generative adversarial network comprising a generative network and a discriminative network;
determining, based on one or more rules relating the one or more characteristics of the generative adversarial network to portions of the one or more computational elements to be used for performing processing operations for the generative network and the discriminative network, separate portions of the one or more computational elements to be used for performing processing operations for the each of the generative network and the discriminative network so that respective execution times are substantially balanced for the generative network and the discriminative network during processing operations for iterations of a training operation; and
setting the separate portions of the one or more computational elements to be used for performing processing operations for the each of the generative network and the discriminative network while subsequently performing iterations of a training operation.

* * * * *